United States Patent [19]

Knowles

[11] 4,402,523

[45] Sep. 6, 1983

[54] TRAILER HITCH

[76] Inventor: Larry F. Knowles, 835 Milwood Ave., Venice, Calif. 90291

[21] Appl. No.: 237,073

[22] Filed: Feb. 23, 1981

[51] Int. Cl.³ .............................................. B60D 1/06
[52] U.S. Cl. ........................... 280/446 B; 188/112 A; 280/406 A
[58] Field of Search ............................ 280/446 R–447, 280/448, 456 R, 456 A, 457, 458, 459, 460 R, 461 R, 462, 474, 477, 478 R, 478 A, 406 A, 439, 440, 441, 483–486, 482; 188/112 R, 112 A

[56] References Cited

U.S. PATENT DOCUMENTS

| | | | |
|---|---|---|---|
| 3,400,948 | 9/1968 | Matson | 280/446 B X |
| 3,552,771 | 1/1971 | Hendricks | 280/446 B X |
| 3,880,263 | 4/1975 | Ewald et al. | 188/112 |
| 3,881,577 | 5/1975 | Wherry et al. | 188/112 |
| 4,278,267 | 7/1981 | Vasseur | 280/406 R |
| 4,306,734 | 12/1981 | Swanson et al. | 188/112 A X |

FOREIGN PATENT DOCUMENTS

| | | | |
|---|---|---|---|
| 2161579 | 12/1971 | Fed. Rep. of Germany | 280/446 B |
| 2408475 | 6/1979 | France | 280/406 A |
| 1167773 | 10/1969 | United Kingdom | 280/446 B |

Primary Examiner—Joseph F. Peters, Jr.
Assistant Examiner—Mitchell J. Hill
Attorney, Agent, or Firm—Beehler, Pavitt, Siegemund, Jagger & Martella

[57] ABSTRACT

A trailer hitch which incorporates a surge brake actuator, together with a load distribution system and sway-damping units. The movable elements of the surge brake actuator system are mounted in sliding plate bearings composed of solid self lubricating resinous material. A frame is included in the movable elements and the load distribution and sway damping systems are anchored to and move with the frame.

6 Claims, 5 Drawing Figures

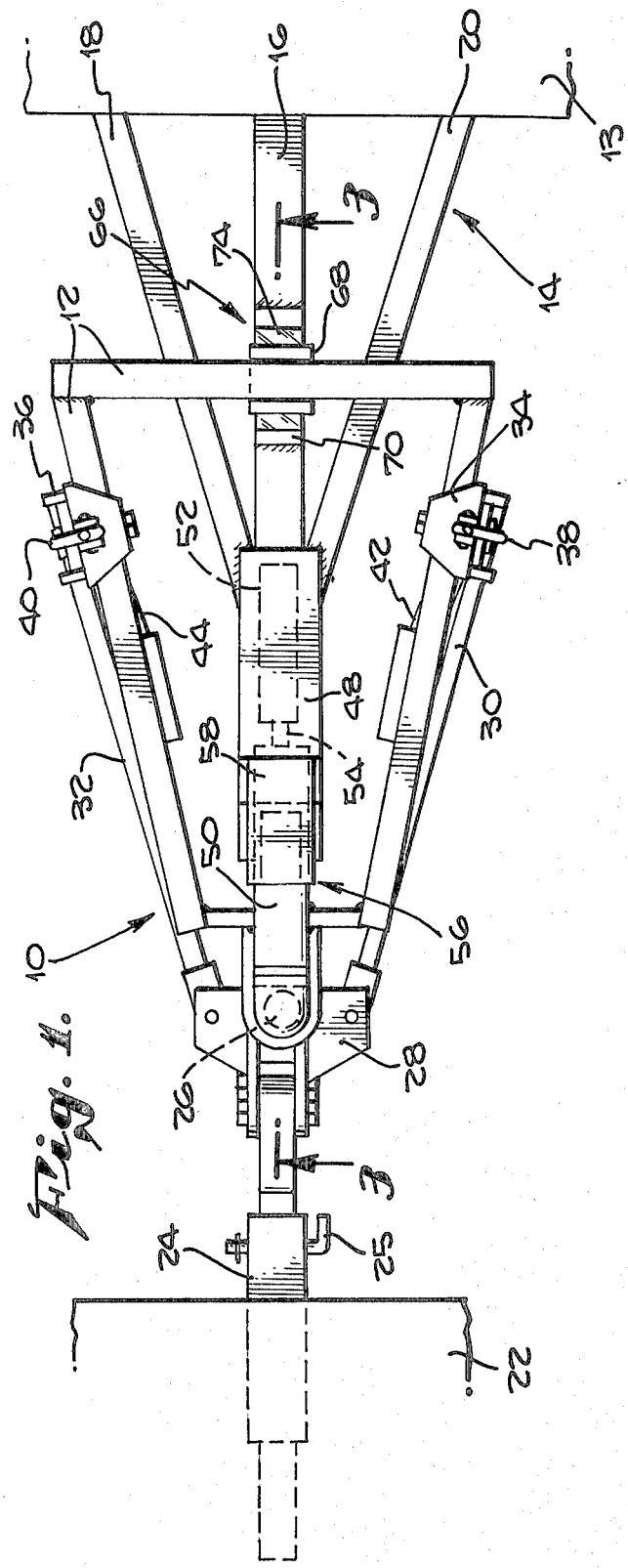

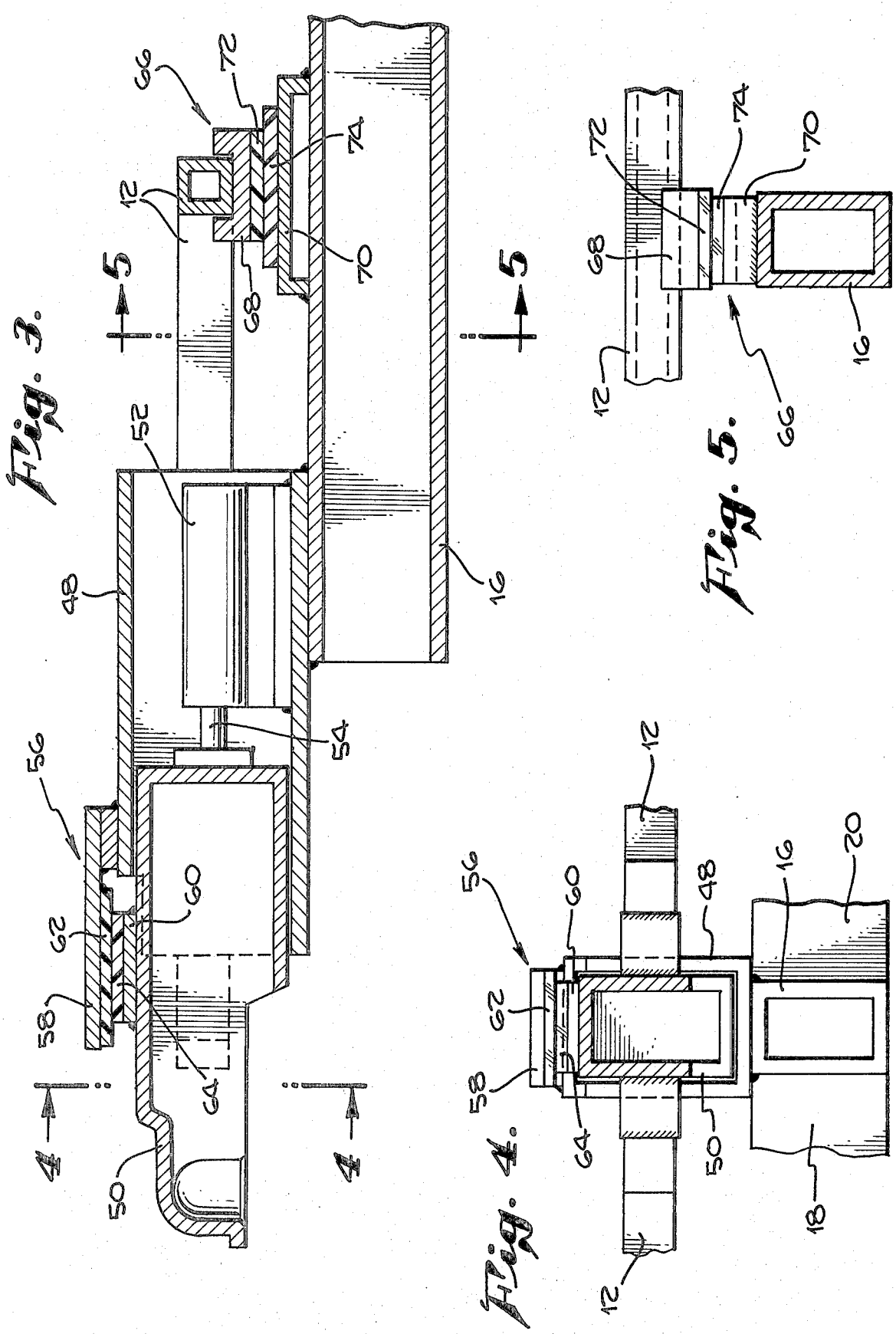

TRAILER HITCH

This invention relates to towed vehicle hitch assemblies, and more particularly to towed vehicle hitch assemblies which include surge brake actuators.

Previously, considerable difficulty has been experienced in achieving satisfactory operation of surge brake actuators, particularly when passenger automobiles were used to tow heavy trailers. Particular difficulties had been experienced when load distributing system has been included in the hitch assembly. For safety purposes, particularly when passenger vehicles are used to tow heavy trailers, load distributing systems, preferably including sway damping units, are highly desirable. Surge-actuated brakes on the towed vehicle are a very desirable safety feature. Previously, the provision of sway damping and load distributing systems and surge brake actuators had been generally unsuccessful, at least over the service life of the equipment, because the necessary and inherent characteristics of the sway damping and load distributing systems tended to render the surge brake actuator partially or totally inoperative immediately, or within a short period of time.

According to the present invention, the movable elements of a surge brake actuator are mounted for movement on sliding plate bearings. At least one of the bearing surfaces is a solid self-lubricating resinous material, such as for example teflon, nylon, high density polyethylene, and the like. Preferably both of the bearing surfaces are composed of such self-lubricating material. The use of a self-lubricating material obviates the necessity for any lubrication material. Lubricants in this particular application tend to accumulate dirt and grime, so as to become very abrasive within a short period of time. This abrasiveness tends to rapidly impair the effectiveness of the surge brake actuator. The use of self-lubricating materials for the bearing surfaces eliminates this problem. The configuring of the bearings so that the bearing surfaces are generally flat permits immediate response from the surge brake actuator, even when the thrust loads are not exactly axially aligned with the hitch assembly. The omniplaner motion, which is permitted by the use of generally planar bearing surfaces according to the present invention, contributes significantly to the safety of this device. Often, under emergency conditions, the thrust forces which should actuate the surge brake actuator are not strictly axially directed. These are precisely the conditions under which the most rapid and accurate response is demanded of the device. In general, the relative movement of the hitch elements to cause actuation of the surge brake actuator is less than two inches and usually is less than one inch. Under these circumstances, prior bearing expedients such as roller bearings and ball bearings tended to wear rapidly into the bearing plates or races, thus resulting in early failure or impairment of the device's function. The use of sliding plate bearings according to the present invention provides the immediate and accurate response which is absolutely necessary for safety purposes.

The present inventon finds particular utility with trailers where the hitch weight of the trailer is several hundred pounds. Heavy trailers may present very hazardous operating conditions where the hitch assembly does not provide for distributing the hitch weight over the four wheels of the towing vehicle. If the weight is not distributed, it tends to force the rear of the towing vehicle down, which causes excessive wear and strain on the rear running gear of the towing vehicle and takes so much weight off the front wheels of the towing vehicle that it may be impaired in its handling characteristics. The combination of weight distribution, sway damping and surge brake actuation provides a safe trailer hitch assembly for the towing by passenger vehicles of even very heavy trailers where the hitch weight is in excess of 600 pounds.

Referring particularly to the drawings for the purposes of illustration only and not limitation, there is illustrated:

FIG. 1, a plan view of a hitch assembly according to the present invention;

FIG. 2, a side elevational view of the hitch assembly embodiment illustrated in FIG. 1;

FIG. 3, a cross-sectional view taken along line 3—3 in FIG. 1;

FIG. 4, a cross-sectional view taken along line 4—4 in FIG. 3;

FIG. 5, a cross-sectional view taken along line 5—5 in FIG. 3;

Referring particularly to the drawings, there is illustrated generally at 10 a hitch assembly, a towed vehicle 13 and a towing vehicle 22. The hitch assembly 10 includes a frame member 12 which is in the form of a truncated triangle. The towed vehicle 13 is mounted to a towed vehicle hitch frame 14, which includes a center spar 16 and triangulated elements 18 and 20, respectively. A receiver 24 is mounted to the towing vehicle 22 and a weight distributing hitch member 28 is mounted in receiver 24 and is held there by pin 25. Weight distributing hitch member 28 includes a ball mount 26 which permits pivotal movement in the conventional fashion so as to accommodate movement between the towed vehicle 13 and the towing vehicle 22. The hitch weight of the towed vehicle is transmitted through this ball mount 26 to the towing vehicle 22. The weight distributing hitch member 28, in cooperation with first and second spring bars 30 and 32, permits the hitch weight to be distributed over all four wheels of the towing vehicle. Pulling up on the outer ends spring bars 30 and 32, which is accomplished by first and second chains 38 and 40, respectively, causes the towing vehicle to pivot about its rear axle so as to force the front wheels of the towing vehicle down. First and second chains 38 and 40 are held in place by first and second snap-up brackets 34 and 36, respectively. Brackets 34 and 36 are mounted to opposed side rail elements of frame member 12. A considerable down load is imposed on element 12 by the drawing up of chains 38 and 40 for the purpose of weight distribution.

Sway control is accomplished by first and second sway control units 42 and 44, respectively. The sway control units 42 and 44 are pivotally attached to opposed elements of frame member 12 at one end and are provided with cam elements, illustrated for example at 46, on the other end. These cam elements function with the remote ends of the spring bars. The cam elements are configured so that when the towed vehicle swerves or sways out of axial alignment with the towing vehicle, an imbalance is created between the forces imposed by the respective spring bars 30 and 32. The imbalance in these forces is such that it tends to dampen the sway or swerve of the towed vehicle.

A surge brake actuator is provided in hitch assembly 10 so that movement of the towed vehicle generally towards the towing vehicle actuates the braking system on the towed vehicle. Movement away from the towing vehicle releases the brakes. This prevents the towed vehicle from overrunning the towing vehicle when the braking system of the towing vehicle is actuated. The telescopable hitch member includes two hitch elements, a towed vehicle telescopable element 48, and a towing vehicle telescoping element 50. Hitch element 50 is telescoped into hitch element 48. Hitch element 48 is rigidly mounted to towed vehicle hitch frame 14. Hitch element 50 is mounted to frame member 12 and incorporates the female half of ball mount 26. A brake cylinder 52 is mounted to hitch element 48 and an actuating rod 54 for brake cylinder 52 is mounted to hitch element 50. Relative motion between hitch elements 48 and 50 operates brake cylinder 52. The loads imposed on hitch elements 48 and 50 during operation are very substantial and tend to be the greatest under those circumstances where immediate accurate response is required on the part of the surge brake actuator. This requires that there be unimpaired relative movement between the hitch elements 48 and 50, despite the heavy loads that may exist on frame member 12 and ball mount 26. Freedom of movement between hitch elements 48 and 50 must also be insured, even when there may be heavy sideloads applied to hitch assembly 10, which tend to twist elements 48 and 50 out of alignment with one another.

Freedom of movement between telescoping elements 48 and 50 is provided according to the present invention by a first sliding plate bearing, indicated generally at 56 and a second sliding plate bearing, indicated generally at 66. First sliding plate bearing 56 is mounted in operative bearing relationship between hitch elements 48 and 50 and includes a first bearing support plate 58, which is rigidly affixed to hitch element 48. A second bearing support plate 60 is rigidly affixed to hitch element 50. A first bearing element 62 is mounted to first bearing support plate 58 and a second bearing element 64 is mounted to second bearing support plate 60. The co-acting bearing surfaces of bearing elements 62 and 64 are generally planer, so as to permit omniplaner motion of hitch elements 48 and 50, thus accommodating both axial and lateral movement, without impairing the operation of the surge brake actuator. The bearing elements 62 and 64 are composed of solid self-lubricating resinous material, so that the presence of lubricants is not required. The self-lubricating bearing elements 62 and 64 are open and unsealed, because they do not tend to attract or hold dirt or sand. Being open to visual inspection enhances safety, because only a glance is required to determine the condition of the bearing. Should the bearing need repair, its open nature facilitates the repair operations. A second sliding plate bearing 66 is located between frame 12 and center spar 16. This bearing is constructed similarly to the first sliding plate bearing 56 and includes a first bearing element support plate 68, which is rigidly mounted to frame 12, a second bearing element support plate 70, which is rigidly mounted to center spar 16 and first and second bearing pads 72 and 74, which are mounted to support plates 68 and 70, respectively. These bearing pads 72 and 74 are composed of the same material used in bearing elements 62 and 64 and bearing 66 is open in a like manner to bearing 56. Because of the substantial loads which must be carried by bearings 56 and 66, the bearing surfaces generally have an area of at least four, and preferably eight or more, square inches. In a preferred embodiment, the bearing surface area of each of bearings 56 and 66 is about 12 square inches. This is substantially more area than is required to carry any loads which the structure could support, however, a substantial margin of safety is provided by the use of oversize bearings. The use of planer bearing elements permits the provision of this extra margin of safety without increasing the complexity of the structure and without significantly increasing its size or weight.

The provision of frame member 12 allows the weight distribution and sway control systems to be used with a surge brake actuator system. Previous attempts to use surge brake actuator systems with weight distribution or load equalizer systems which did not incorporate a slideably mounted frame to attach the spring bars to had been generally ineffective, because the loads imposed on the brake actuator system were such that it operated erratically or failed completely.

The free ends of the spring bars 30 and 32 are, as previously described, adjustably connected or anchored to the respective side rails of frame member 12. This causes a substantial down load on frame 12, which is borne in large part by second sliding plate bearing 66. The elements of the weight distribution system and the sway control units, together with hitch element 50, move with the towing vehicle. In this way the weight distributing and sway control systems are not effected by relative movement between hitch elements 48 and 50. Spring bars 30 and 32 function as levers which acts through the weight distributing hitch member 28 to cause the towing vehicle 22 to pivot about its rear axle. The amount of force applied by spring bars 30 and 32 is determined by the adjustment of chains 38 and 40 in snap-up brackets 34 and 36.

What has been described are preferred embodiments in which modifications and changes may be made without departing from the spirit and scope of the accompanying claims.

What is claimed is:

1. A towed vehicle hitch assembly for coupling a towed vehicle to a towing vehicle comprising:
   a surge brake means for actuating the braking system of a towed vehicle responsive to deceleration of a towing vehicle, said surge brake means including a brake actuator device mounted between first and second elements of a hitch member, said first and second elements being mounted for relative movement, said brake actuator device being actuatable responsive to said relative movement, at least one sliding bearing, operatively associated with said first and second elements permitting said relative movement, said sliding bearing having generally planer bearing surfaces, at least one of said bearing surfaces being composed of solid self-lubricating resinous material and permitting unimpaired omniplaner movement of said first element relative to said second element.

2. A towed vehicle hitch assembly of claim 1 wherein said first and second elements are telescopically mounted.

3. A towed vehicle hitch assembly of claim 1 wherein said sliding bearing includes a first block of said resinous material mounted to said first element and a second block of said resinous material mounted to said second element.

4. A towed vehicle hitch assembly of claim 1 wherein each of said generally planer bearing surfaces has an area of at least about four square inches.

5. A towed vehicle hitch assembly of claim 1 wherein said first and second elements are telescopically mounted to one another to form a telescopable hitch member and said brake actuator device is mounted within said telescopable hitch member.

6. A towed vehicle hitch assembly for coupling a towed vehicle to a towing vehicle comprising:
sway control means for damping swaying movement of a towed vehicle;
weight distribution means for distributing the hitch weight of a towed vehicle over the wheels of a towing vehicle; and
surge brake means for actuating the braking system of a towed vehicle responsive to deceleration of a towing vehicle, said surge brake means including a telescopable hitch member having a towed vehicle element and a towing vehicle element, said elements being telescopically mounted together for telescoping movement relative to one another, said surge brake means including a brake actuator device mounted between said elements and actuatable responsive to said telescoping movement, said telescopable hitch member including at least one sliding bearing operatively associated with said elements, said bearing having generaly planer bearing surfaces comprising self-lubricating low friction resinous material, said bearing permitting omniplanar unimpaired movement between said elements.

* * * * *